July 19, 1927.
G. MARANDINO
ICE CREAM CUTTER
Filed March 29, 1926
1,636,142
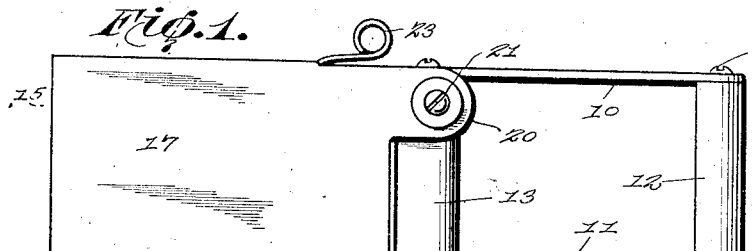
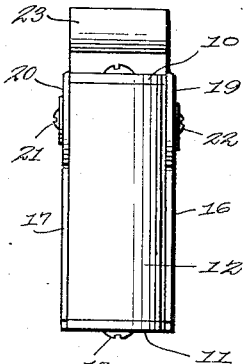
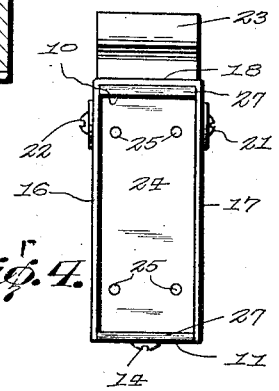
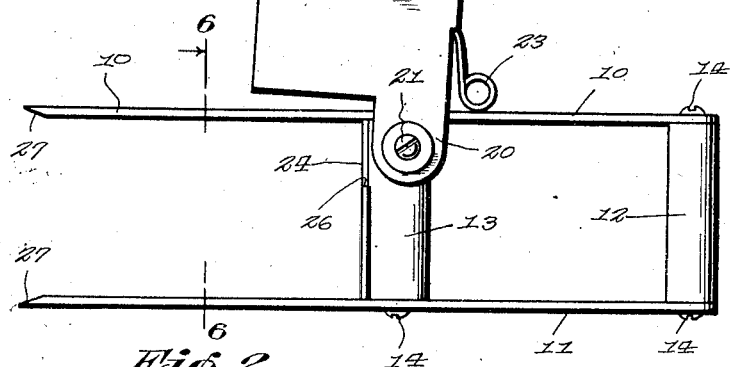
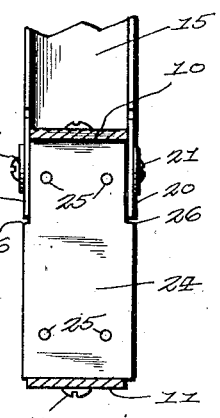
Inventor:
Gerardo Marandino.
By Macdonald & Macdonald
Attorney Patented July 19, 1927.

1,636,142

UNITED STATES PATENT OFFICE.

GERARDO MARANDINO, OF BROOKLYN, NEW YORK.

ICE-CREAM CUTTER.

Application filed March 29, 1926. Serial No. 98,195.

This invention relates to improvements in devices for handling frozen delicacies and has special reference to an implement adapted to scoop or cut a quantity of ice cream from the ordinary container and to mold the same to a form for making ice cream sandwiches.

The primary object of the invention resides in the provision of an implement of the above character embodying means for forming a pre-determined block of ice-cream or similar material.

Another object is to provide means for facilitating the insertion of the scoop portion within a quantity of frozen material in bulk.

A further object resides in the provision of means for facilitating the removal of the formed block of ice cream.

Still another object is to provide means in the nature of a stop, cooperatively arranged to materially assist in the manipulation of the block-removing means.

With these objects in view, together with others which will appear as the description proceeds, the invention resides in the novel formation, combination, and arrangement of parts, all as will be described more fully hereinafter, illustrated in the drawings, and particularly pointed out in the claims.

In said drawings:

Figure 1 is a side elevation of the device, the component parts thereof being shown in the particular position they assume just prior to insertion into a quantity of ice cream.

Fig. 2 is a view like unto Fig. 1, but showing the means for facilitating the removal of the formed block of material in elevated position. The means for limiting the swing of said means is also shown in this view.

Fig. 3 is an end view of the device as seen from the right of Fig. 1.

Fig. 4 is a view of the opposite end thereof.

Fig. 5 is a longitudinal central vertical sectional view of the implement; and

Fig. 6 is a transverse section taken substantially on the line 6—6 of Fig. 2, to further illustrate the means serving as a rear lining and stop plate.

Upon inspection of the accompanying drawings, it will be observed that my improved ice cream implement comprises essentially a pair of spaced members 10 and 11 respectively. These members are disposed one over the other and parallelly spaced by means of the filler pieces 12 and 13, the former being positioned at the terminals of said members, while the latter is located intermediate the ends of said members, any form of fastening means 14, such as screws or the like, being used in the above construction.

The means for facilitating the removal of the formed block of ice cream, denoted generally by the numeral 15, is preferably integrally formed and comprises the side portions 16 and 17, which are connected by the top portion 18, said side portions projecting rearwardly to present ears 19 and 20 for pivotal connection to the cross piece 13 as indicated at 21 and 22. A thumb-piece 23 is also provided at the top of the device, the construction thereof and its function being described in detail hereinafter.

From the foregoing it is manifest that when the part 15 embraces the members 10 and 11 an open-end chamber is defined, the proportions thereof being arranged to take a thin slab of ice cream from a container for the purpose of making the well-known ice cream sandwiches or similar confections. This chamber has a rear lining 24 secured to the cross-piece 13, as indicated at 25, the opposite sides thereof being extended outwardly, (see Fig. 6) to provide a stop for the part 15 and to prevent leakage at the rear thereof. The shoulders 26 defined by the extension are positioned just below the lower edges of the ears 19—20.

The thumb-piece 23, herein referred to, is preferably formed by slitting the top portion 18, and curling the material into the proper form and then spacing the same from the top. While, of course, this perhaps is the simplest method to fashion the part, it should be understood that other methods may be adopted, provided its position is such as to bear upon the member 10 and limit the elevated position of the part 15 as shown in Fig. 2.

The simplicity of my device is now quite apparent, since it contains but few parts, easily assembled and practically non-destructible. As distinguished from the devices at present in use, it does not depend on a special mechanism for ejecting the block of ice cream, such omission being possible by the simple expedient of a pivotal arrangement.

In the use of the implement the operator grasps the rear portion of same with the tip of the thumb bearing gently on the piece 23 in order to remove the possibility of an elevation of the part 15. The forward end is then inserted into a bulk of ice cream, the entrance thereof being facilitated by beveling the forward ends of the members 10 and 11 as indicated at 27. This operation is continued until the chamber is filled with the material, whereupon the device is withdrawn, part 15 elevated by crooking the thumb over the piece 23, the implement being now turned upon one of its sides and upon the rearward movement of the same across a strip of pastry held in the palm of the other hand, the block slides longitudinally of the members 10 and 11, by the forward ends thereof and is finally freed upon the strip of pastry. The other strip is applied to the block of ice cream and the sandwich is ready for consumption.

My device really embodies a combined scoop and mold, in that the ice cream or similar material is withdrawn from the bulk and formed into the proper shape at practically one operation. Since the part 15 comprises the major portion of the bounded sides of the chamber, my ability to remove this area leaves the block of ice cream exposed by a substantial area and, of course, this materially simplifies the removal of said block, and since the adhesion between the strip of pastry and said block is quite sufficient to overcome the small amount of friction exerted between the inner sides of the members 10 and 11, the use of plungers, springs or similar devices, is obviated. This is a feature of some importance.

While the present is a disclosure of the embodiment of the invention, it is to be understood that the invention is not limited thereto, as various changes in the minor details of construction, proportion and arrangement of parts may be resorted to without departing from the spirit of the invention as defined in the appended claims.

I claim:

1. A device of the character described comprising spaced members, a pair of filler pieces connecting said members, one of said filler pieces being located intermediate the ends of said members, the other filler piece being located at one end of said members to make a handle therefor, and means adapted to embrace the loose end of said members, pivoted to the intermediate filler piece and comprising a top and side walls and co-operating with said members to define an open-end material-receiving chamber.

2. A device of the character described comprising spaced members, a pair of filler pieces connecting said members, one of said filler pieces being located intermediate the ends of said members, the other filler piece being located at one end of said members to make a handle therefor, and means adapted to embrace the loose end of said members and comprising a top and side walls and co-operating with said members to define an open-end material-receiving chamber, said side walls projecting rearwardly to present ears for pivotal attachment to the intermediate filler piece.

3. A device of the character described comprising spaced members, a pair of filler pieces connecting said members, one of said filler pieces being located intermediate the ends of said members, the other filler piece being located at one end of said members to make a handle therefor, means adapted to embrace the loose end of said members and comprising a top and side walls and co-operating with said members to define an open-end material-receiving chamber, said side walls projecting rearwardly to present ears for pivotal attachment to the intermediate filler piece, and means associated with said chamber-defining means to swing the side walls above the top member to expose the material in said chamber.

4. A device of the character described comprising a pair of spaced members, filler pieces connecting said members, one of said pieces being positioned at the terminals of said members to define a handle, the other being located intermediate the ends of said members, means adapted to embrace the outer ends of said members comprising side walls and co-operating therewith to define an open-end material-receiving chamber, said side walls projecting rearwardly to present ears for pivotal attachment to the intermediate filler piece, means carried by said filler piece to provide a stop for the side walls, and means for withdrawing the side walls from said spaced members to expose the material therebetween.

5. A device of the character described comprising a pair of spaced members, filler pieces connecting said members, one of said pieces being positioned at the terminals of said members to define a handle, the other being located intermediate the ends of said members, means adapted to embrace the outer ends of said members comprising a top and side walls and co-operating with said members to define an open-end material-receiving chamber, said side walls projecting rearwardly to present ears for pivotal attachment to the intermediate filer piece, a lining carried by said intermediate filler piece and forming the rear of said chamber, said lining having its opposite sides extending laterally to define shoulders adjacent to the lower edges of said ears to provide a stop for said side walls, and a thumb-piece connected to the spaced members for holding the parts in closed position during the filling operation and for facilitating the elevation of the side walls clear of said members in the discharging operation.

6. A device of the character described comprising spaced members, a filler piece connected to said members so as to leave one end thereof free, and means adapted to embrace the loose end of said members pivoted to the filler piece and comprising a top and side walls and co-operating with said members to define an open-end material-receiving chamber.

GERARDO MARANDINO.